UNITED STATES PATENT OFFICE.

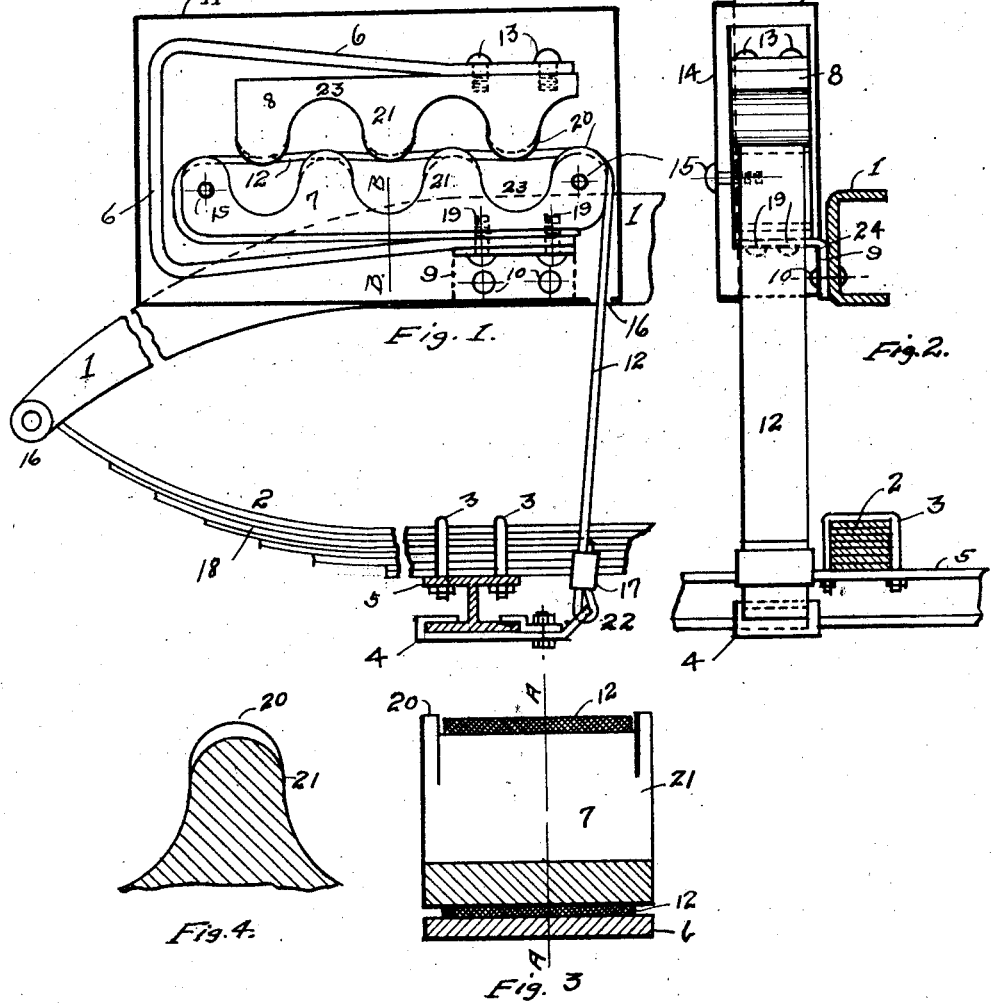

CLAUDE M. GARLAND, OF CHICAGO, ILLINOIS.

SHOCK ABSORBER.

1,405,912.   Specification of Letters Patent.   Patented Feb. 7, 1922.

Application filed August 1, 1919. Serial No. 314,628.

*To all whom it may concern:*

Be it known that I, CLAUDE M. GARLAND, a citizen of the United States, residing in Chicago, in the county of Cook and State of Illinois, have invented new and useful Improvements in Shock Absorbers, of which the following is a specification.

My invention relates to devices commonly known as shock absorbers which are used to prevent the sudden rebound of the frame of a vehicle due to the action of the springs on striking an irregularity in the road. The object of my invention is to produce a shock absorber which is simple in construction and silent in operation.

These things I accomplish in a manner which will best be understood by referring to the drawings which form a part of the specification and the accompanying description.

Referring to the drawings, Figure 1 shows a side elevation of one of my shock absorbers with the cover removed, applied to the frame of an automobile. Figure 2 shows a front elevation also with the end removed while Figure 3 shows a section on the line B B of Figure 1. Figure 4 shows a section on the line A A of Figure 3. Like numerals refer to like parts in the several figures.

Referring to the drawings, the numeral 1 indicates the frame of the automobile to which the spring 2, made up of the leaves 18 is rigidly attached by means of the pivot 16. To the spring 2 is rigidly connected by means of the bolts 3, the axle 5.

The shock absorber consists of a flat U shaped spring 6, to the ends of which are bolted by means of the screw bolts 13 and 19, the intermeshing blocks 7 and 8. Extending between these blocks is a flexible strip 12 which is made out of either canvas or leather and which is connected at 22 to the shaft 5 by means of a clip 4. The buckle 17 is used to clamp down the end of the strip 12. The strip 12 passes around the intermeshing block 7 and is clamped between this block and the spring 6. The spring 6 is rigidly attached to the frame 1 of the automobile by means of a bracket 9 and the rivets 10 and the screw bolts 19.

The intermeshing faces of the blocks 7 and 8 are corrugated, that is made up of alternate depressions 23 and teeth 21. The blocks are so located that the teeth 21 on one block are adapted to mesh with the depressions 23 in the opposite block. There are preferably a plurality of corrugations in the face of each block. Figure 3 shows a section on the line B B of Figure 1 while figure 4 shows a section on the line A A of Figure 3. At the top of each tooth and on each side is located a shroud 20 which tends to prevent the strip 12 slipping from between the intermeshing blocks 7 and 8.

The blocks 7 and 8 are preferably attached near the ends of the spring 6 in order to obtain advantage of the full length of the spring in deflecting. This permits deeper meshing and thereby a small number of teeth will take up a large amount of slack in the strip 12.

The shock absorber is enclosed within a sheet metal casing 11 which is provided with a removable cover 14 which is normally held in place by means of the screws 15 which fasten the removable cover to the lower stationary block 7. A slot 16 is provided in the bottom of the sheet metal casing 11 for the passage of the strip 12. A slot 24 is also provided in the side of the case 11 for the admission of the bracket 9 to which the casing 11 is riveted by means of the rivets 10.

The shock absorber is preferably applied in a horizontal position as shown in Figure 1. It may, however, be applied in a vertical position or at any angle to the frame as may be desired.

The operation of the device is as follows:

When the automobile is at rest one end of the flexible strip 12 is rigidly connected at 22 to some part of the axle 5 through any suitable means. The shock absorber is then attached to some part on the frame by bolting the spring 6 or the block 7 to some form of bracket 9 rigidly attached to the frame. The tension in the strip 12 is adjusted by means of the buckle 17 so that the shock absorber is held open and the strip 12 approximates a straight line extending between the blocks 7 and 8 when the automobile frame is in its normal position. When the strip through the shock absorber thus approximates a straight line, the frame 1 and the spring 2 are in their normal spaced relation, which is also the maximum spaced relation of these parts for in order for the frame to rise to a higher spaced relation with respect to the spring, the strip 12 must either break or stretch. This feature of the device, which always brings the frame to rest in its normal position, is of the first importance in the stopping of synchronous vibrations set up in the frame by the vehicle passing over equally spaced bumps which frequently occurs. In such occurrences, on striking the first bump, the frame descends and by the time the second bump is struck, the frame is ascending and is given additional momentum by the striking of the second bump and if a third bump also is struck as the frame is again rising, an ordinary shock absorber device which does not stop the frame in its normal position will allow these vibrations of the frame to gain in amplitude from bump to bump and will render the use of the shock absorbing device of little value.

When the automobile is in motion and an irregularity in the road is struck the frame 1 descends pressing down the spring 2 which produces a certain amount of slack in the strip 12. When this slack is produced the spring 6 depresses the block 8 so that it meshes with the block 7 thereby pressing the strip 12 into mesh between the blocks 7 and 8 thereby taking up the slack produced by the deflection of the spring 2. Immediately after the spring 2 is deflected there is a re-action which suddenly tends to throw up the frame 1. This sudden throwing up of the frame 1 where the shock absorber is not used throws this frame 1 up very rapidly which not only throws the passengers from the seats of the automobile but throws the frame 1 higher than its normal position and therefore tends to break the main leaf of the spring 2. When the shock absorber is applied the spring re-acts to throw the frame 1 upward but due to the fact that the slack of the strip 12 has been taken up in the meshing of the blocks 7 and 8 the reaction of the spring 2 must pull this strip 12 out of the blocks 7 and 8 and cause it to assume the position as shown in the Figure 1. This strip must be pulled out of the blocks 7 and 8 against the action of the spring 6 and the friction produced by the intermeshing blocks 7 and 8. The size of the spring 6 and the number of intermeshing teeth 21 on the blocks 7 and 8 are so adjusted that it is not possible for the frame 1 to rise higher than the normal position shown in the Figure 1. The combined friction of the strip 12 in pulling out of the intermeshing blocks 7 and 8 against the action of the spring 6 is also sufficient to prevent the sudden rise of the frame 1. The result is that the automobile rides over rough roads with a minmum of shock and disturbance to the occupants.

Instead of using the two intermeshing blocks bolted to the ends of the U shaped spring the ends of the spring may be corrugated to form the intermeshing surfaces. While this is a simple arrangement it has the objection that it makes the spring longer than is desirable for the purpose and the corrugations in the spring are much heavier than the intermeshing blocks which are preferably made of aluminum.

It will be noted from the construction of the shock absorber that there are no loose parts. This prevents the possibility of noise which is always objectionable in a device of this character. It will also be seen that a compact, simple arrangement is provided which is efficient and silent in action. While the elements shown and described are well adapted to serve the purpose for which they are intended, it is to be understood that the invention is not limited to the precise construction set forth but includes within its purview such changes as may be made within the scope of the appended claims.

What I claim is:

1. In combination with a vehicle frame, an axle and a spring disposed between the axle and frame, a flexible strip, one end whereof is connected to said axle while the other end is connected to said vehicle frame, a pair of members arranged in opposing relation on opposite sides of said flexible strip and provided with corrugated surfaces adapted to mesh with one another when said members are brought into juxtaposition, and resilient means normally tending to force said members into meshing relation with said flexible strip therebetween.

2. The combination of a vehicle frame, a vehicle axle, a vehicle spring there-between, one end of a flexible strip rigidly attached to the said vehicle axle, the opposite end of the said flexible strip attached to the said vehicle frame, a pair of intermeshing blocks for taking up the slack in the said flexible strip, a spring attached to each of the said intermeshing blocks and adapted to hold the said blocks in mesh, the said spring being rigidly attached to the said vehicle frame.

3. In a device of the character described a pair of intermeshing blocks, a flexible strip extending between the said intermeshing blocks, a spring for holding the said blocks in mesh, means for attaching the said spring to the frame of a vehicle, means for attaching one end of the said flexible strip to the frame of the said vehicle and means for attaching the opposite end of the said flexible strip to the axle of the said vehicle.

4. In a device of the character described intermeshing means, a flexible strip extending between the said intermeshing means, resilient means for holding the said intermeshing means in mesh, means for attaching the said intermeshing means to the vehicle frame, means for attaching one end of the said flexible strip to the said vehicle frame and means for attaching the opposite end of the said flexible strip to the vehicle axle.

5. In a device of the character described a pair of intermeshing blocks, a flexible strip extending between the said intermeshing blocks, a spring for holding the said blocks in mesh, common means for attaching one end of the said spring, one end of the said flexible strip and one of the said intermeshing blocks to a vehicle frame and means for attaching the opposite end of the said flexible strip to the axle of a vehicle.

6. In a device of the character described, a pair of corrugated surfaces, a flexible strip extending between the said corrugated surfaces and a spring adapted to hold the said surfaces in mesh.

7. In a device of the character described, a pair of blocks, corrugated surfaces forming the inner faces of said blocks, the corrugation of said surfaces being adapted to mesh with each other, a flexible strip extending between the said corrugated surfaces, a spring for holding the corrugated surfaces of the said blocks in mesh, one end of the said flexible strip connected to the said spring and the opposite end of the said strip provided with adjustable means for adjusting the length thereof.

8. In a device of the type described a U shaped spring, a block rigidly attached to one end of the said spring a corrugated surface formed on the inner side of the said block, a block rigidly attached to the other end of the said spring, the inner surfaces of the last named block also being corrugated, the corrugations of the first named block adapted to mesh with the corrugations of the last named block, a flexible strip extending between the corrugations of the said blocks, one end of the said flexible strip adapted to fasten to the frame of the vehicle, the opposite end of the said flexible strip adapted to fasten to the axle of a vehicle a rigid connection between the said frame and the said U shaped spring and a casing enclosing the said device.

9. In a device of the character described a U shaped spring, a pair of intermeshing surfaces forming the end of the said U shaped spring, a flexible strip extending between the said surfaces, one end of the said strip adapted to connect to the axle of a vehicle the opposite end of the said strip adapted to connect to the said U shaped spring and means for connecting the said U shaped spring to the frame of a vehicle.

10. In a device of the character described, a U shaped spring, one of a pair of intermeshing blocks attached to each end of the said U shaped spring, a flexible strip extending between the said intermeshing blocks, and a shroud at each end of each tooth of the said intermeshing blocks whereby the said flexible strip is held between the said blocks, substantially as described.

11. A device of the character described, comprising corrugated elements disposed in opposing relation and flexible means of predetermined length adapted to be secured to the frame and to the running gear of the vehicle, and disposed between said corrugated elements to be frictionally held thereby, and normally tending to maintain the said elements in spaced relation.

12. A device of the character described, comprising a yielding element adjustably secured at the ends to the frame and running gear of a vehicle and a pair of corrugated members disposed on the opposite side of the said yielding element adapted to normally press the said element in opposite directions and provide frictional relation therewith.

13. A device of the character described comprising a yielding element adjustably secured at one end to the running gear of a vehicle, a pair of members disposed on opposite sides of the said yielding element securely attached to the said vehicle frame and adapted to normally press said element in opposite directions and provide frictional relation therewith, and the opposite end of the said yielding element securely attached to one of the said pair of members oppositely disposed.

14. A device of the character described comprising oppositely movable members provided with correlated surfaces securely attached to one of the parts of a vehicle to be controlled, compression means for forcing said members toward each other, yielding means adapted to be secured at one end to one of the said oppositely movable members, the opposite end of said yielding means securely attached to the other of the said vehicle parts to be controlled so as to be adjusted taut when the two parts of the said vehicle to be controlled are in normal spaced relation, said yielding means being disposed across the path of both members to be enfolded thereby and frictionally held therebetween when the spaced relation between the two parts of the vehicle to be controlled is reduced.

In testimony whereof I have signed my name to this specification in the presence of two subscribing witnesses.

CLAUDE M. GARLAND.

Witnesses:
N. M. HARLOW,
N. A. GIBSON.